US009111255B2

(12) United States Patent
Nurmi

(10) Patent No.: US 9,111,255 B2
(45) Date of Patent: Aug. 18, 2015

(54) METHODS, APPARATUSES AND COMPUTER PROGRAM PRODUCTS FOR DETERMINING SHARED FRIENDS OF INDIVIDUALS

(75) Inventor: Mikko Antero Nurmi, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 295 days.

(21) Appl. No.: 12/872,724

(22) Filed: Aug. 31, 2010

(65) Prior Publication Data

US 2012/0054691 A1    Mar. 1, 2012

(51) Int. Cl.
G06F 3/0481    (2013.01)
G06Q 10/10    (2012.01)
G06F 17/30    (2006.01)
G06K 9/00    (2006.01)

(52) U.S. Cl.
CPC .............. *G06Q 10/10* (2013.01); *G06F 3/0481* (2013.01); *G06F 17/30864* (2013.01); *G06K 9/00228* (2013.01)

(58) Field of Classification Search
USPC ............................ 715/854; 707/741; 382/118
See application file for complete search history.

(56) References Cited

U.S. PATENT DOCUMENTS

| 7,752,553 | B2 * | 7/2010 | Pennington et al. | 715/751 |
|---|---|---|---|---|
| 7,788,247 | B2 * | 8/2010 | Wang et al. | 707/705 |
| 7,886,024 | B2 * | 2/2011 | Kelly et al. | 709/219 |
| 7,890,871 | B2 * | 2/2011 | Etkin | 715/738 |
| 8,302,015 | B2 * | 10/2012 | Krishnan et al. | 715/747 |
| 8,332,475 | B2 * | 12/2012 | Rosen et al. | 709/206 |
| 2003/0158855 | A1 * | 8/2003 | Farnham et al. | 707/102 |
| 2004/0109197 | A1 * | 6/2004 | Gardaz et al. | 358/1.15 |
| 2006/0253491 | A1 * | 11/2006 | Gokturk et al. | 707/104.1 |
| 2006/0264209 | A1 * | 11/2006 | Atkinson et al. | 455/422.1 |

(Continued)

FOREIGN PATENT DOCUMENTS

| EP | 2023583 A1 | 2/2009 |
|---|---|---|
| WO | WO 2009/116049 A2 | 9/2009 |
| WO | WO 2010/024992 A1 | 3/2010 |

OTHER PUBLICATIONS

International Search Report and Written Opinion of the International Searching Authority mailed Feb. 9, 2012, for International Application No. PCT/IB2011/001976 filed Aug. 29, 2011.

(Continued)

*Primary Examiner* — Phenuel Salomon
(74) *Attorney, Agent, or Firm* — Alston & Bird LLP

(57) ABSTRACT

An apparatus for providing a user-friendly and efficient manner to determine one or more shared friends of individuals may include a processor and memory storing executable computer program code that cause the apparatus to at least perform operations including receiving an indication of a selection of at least one tagged face from an image. The computer program code may further cause the apparatus to facilitate sending of a generated message to a device requesting identification of one or more commonly shared friends of at least two individuals in response to receipt of the selection of the tagged face. The tagged face corresponds to one of the individuals. The computer program code may further cause the apparatus to enable provision of display of visible indicia, superimposed on the image, indicating whether the individuals have one or more commonly shared friends. Corresponding methods and computer program products are also provided.

16 Claims, 9 Drawing Sheets

(56) References Cited

U.S. PATENT DOCUMENTS

| | | | |
|---|---|---|---|
| 2007/0282987 A1* | 12/2007 | Fischer et al. | 709/223 |
| 2008/0040474 A1* | 2/2008 | Zuckerberg et al. | 709/224 |
| 2008/0077595 A1 | 3/2008 | Leebow | |
| 2008/0091723 A1* | 4/2008 | Zuckerberg et al. | 707/104.1 |
| 2008/0288612 A1* | 11/2008 | Kwon | 709/220 |
| 2009/0103887 A1* | 4/2009 | Choi et al. | 386/52 |
| 2009/0119608 A1 | 5/2009 | Huskey | |
| 2009/0271370 A1* | 10/2009 | Jagadish et al. | 707/3 |
| 2009/0319288 A1* | 12/2009 | Slaney et al. | 705/1 |
| 2010/0169480 A1* | 7/2010 | Pamidiparthi | 709/224 |
| 2010/0191844 A1 | 7/2010 | He et al. | |
| 2010/0287053 A1* | 11/2010 | Ganong et al. | 705/14.66 |
| 2011/0013810 A1* | 1/2011 | Engstrom et al. | 382/118 |
| 2011/0078190 A1* | 3/2011 | Samuel et al. | 707/780 |
| 2011/0166928 A1* | 7/2011 | Robinson et al. | 705/14.49 |
| 2011/0211736 A1* | 9/2011 | Krupka et al. | 382/118 |

OTHER PUBLICATIONS

National Office of Industrial Property, Office Action for Application No. 1-2013-00663, Jun. 18, 2015, 2 pages, Socialist Republic of Vietnam

* cited by examiner

METHODS, APPARATUSES AND COMPUTER PROGRAM PRODUCTS FOR DETERMINING SHARED FRIENDS OF INDIVIDUALS

TECHNOLOGICAL FIELD

An example embodiment of the invention relates generally to user interface technology and, more particularly, relates to a method, apparatus, and computer program product for providing a user-friendly and efficient manner in which to determine commonly shared friends of individuals using communication devices.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase convenience to users relates to improving a user's ability to effectively interface with the user's communication device. Accordingly, numerous user interface mechanisms have been developed to attempt to enable a user to more easily accomplish tasks or otherwise improve the user's experience in using the device.

In this regard, some users may have a preference for use of a touch screen display for entry of user interface commands or simply creating content over other alternatives. In recognition of the utility and popularity of touch screen displays, many devices, including some mobile terminals, now employ touch screen displays. As such, touch screen devices are relatively well known with numerous different technologies being employed for sensing a particular point at which an object may contact the touch screen display.

A user's experience during certain applications such as, for example, web browsing or applications that enable provision of social network services may be enhanced by using a touch screen display as the user interface. For instance, users of social network services may utilize user interfaces such as touch screen devices to create profiles, upload and share photos, list personal interests, contact information and other personal information, identify and connect with any number of friends and other users as well as perform a number of other functions. Currently, there are multiple social network services available and accessible to users of communication devices such as, for example, Facebook™, Twitter™, MySpace™, LinkedIn™, etc. These social network services typically have millions of users.

Given the popularity of various social network services and that these social network services enable identification of users' friends and handle communications between friends for millions of users, it may be beneficial to provide a more user-friendly manner in which to efficiently determine shared friends of individuals based on information from one or more social network services.

In this regard, it may be desirable to provide a touch screen device with user interface commands that provides a user-friendly and efficient manner in which to determine common friends of individuals.

BRIEF SUMMARY

A method, apparatus and computer program product are therefore provided for generating a user-friendly, efficient and reliable manner in which to determine common friends of individuals. An example embodiment may enable capture, receiving, downloading or viewing of one or more images and/or videos. One or more faces of persons in the images or videos may be tagged. The faces of the persons may be tagged in part based on a selection by a user utilizing a communication device. Alternatively, the communication device may automatically tag one or more faces in an image(s) or video(s).

In response to receipt of a selection of one or more tagged faces in an image/video, the communication device may generate a message that is sent to one or more network devices providing social network services. The message may include data requesting the one or more network devices to determine any friends that at least two individuals share in common. In one example embodiment, the two individuals may correspond to two different tagged faces of the image/video that may be selected by a user. In another example embodiment, one of the two individuals may correspond to a tagged face that is selected from the image/video and the other individual may correspond to a user of the communication device.

In an instance in which the network devices providing the social network services determines that that there are common friends shared by the individuals, the network devices may provide this information to the communication device. The information may include visible indicia denoting the commonly shared friends. For example, the visible indicia may include, but is not limited to, images of the shared friends, graphical elements corresponding to names of the shared friends, etc. The communication device may enable display of the visible indicia (e.g., images of the shared friends) superimposed on at least a portion of the image/video.

On the other hand, in an instance in which the network devices determine that there are no commonly shared friends between the individuals, the network devices may provide the communication device with information (e.g., visible indicia) identifying a shortest path relationship between the individuals. The shortest path relationship may relate to information identifying one or more persons in which the individuals may be indirectly connected. The communication device may enable display of the shortest path relationship (e.g., images of persons indirectly connecting the individuals) superimposed on a portion of the image/video.

In one example embodiment, a method for providing a user-friendly and efficient manner to determine one or more shared friends of individuals is provided. The method includes receiving an indication of a selection of at least one tagged face from an image and facilitating sending of a generated message to a device requesting identification of one or more commonly shared friends of at least two individuals in response to receipt of the selection of the tagged face. The tagged face corresponds to one of the individuals. The method further includes enabling, via a processor, provision of display of visible indicia. The visible indicia is superimposed on the image indicating whether the individuals have one or more commonly shared friends.

In another example embodiment, an apparatus for providing a user-friendly and efficient manner to determine one or more shared friends of individuals is provided. The apparatus may include a processor and a memory including computer program code. The memory and the computer program code are configured to, with the processor, cause the apparatus to at least perform operations including receiving an indication of a selection of at least one tagged face from an image and facilitate sending of a generated message to a device requesting identification of one or more commonly shared friends of at least two individuals in response to receipt of the selection of the tagged face. The tagged face corresponds to one of the individuals. The memory and the computer program code may further cause the apparatus to enable provision of display of visible indicia. The visible indicia is superimposed on the image indicating whether the individuals have one or more commonly shared friends.

In another example embodiment, a computer program product for providing a user-friendly and efficient manner to determine one or more shared friends of individuals is provided. The computer program product includes at least one computer-readable storage medium having computer-executable program code instructions stored therein. The computer executable program code instructions may include program code instructions configured to receive an indication of a selection of at least one tagged face from an image and facilitate sending of a generated message to a device requesting identification of one or more commonly shared friends of at least two individuals in response to receipt of the selection of the tagged face. The tagged face corresponds to one of the individuals. The program code instructions may also to enable provision of display of visible indicia. The visible indicia is superimposed on the image indicating whether the individuals have one or more commonly shared friends.

In another example embodiment, an apparatus for providing a user-friendly and efficient manner to determine one or more shared friends of individuals is provided. The apparatus includes means for receiving an indication of a selection of at least one tagged face from an image and means for facilitating sending of a generated message to a device requesting identification of one or more commonly shared friends of at least two individuals in response to receipt of the selection of the tagged face. The tagged face corresponds to one of the individuals. The apparatus also includes means for enabling provision of display of visible indicia. The visible indicia is superimposed on the image indicating whether the individuals have one or more commonly shared friends.

An embodiment of the invention may provide a better user experience given the ease and efficiency in determining one or more shared friends of individuals via a user interface. As a result, device users may enjoy improved capabilities with respect to applications and services accessible via the device.

BRIEF DESCRIPTION OF THE SEVERAL VIEWS OF THE DRAWINGS

Figure 1:
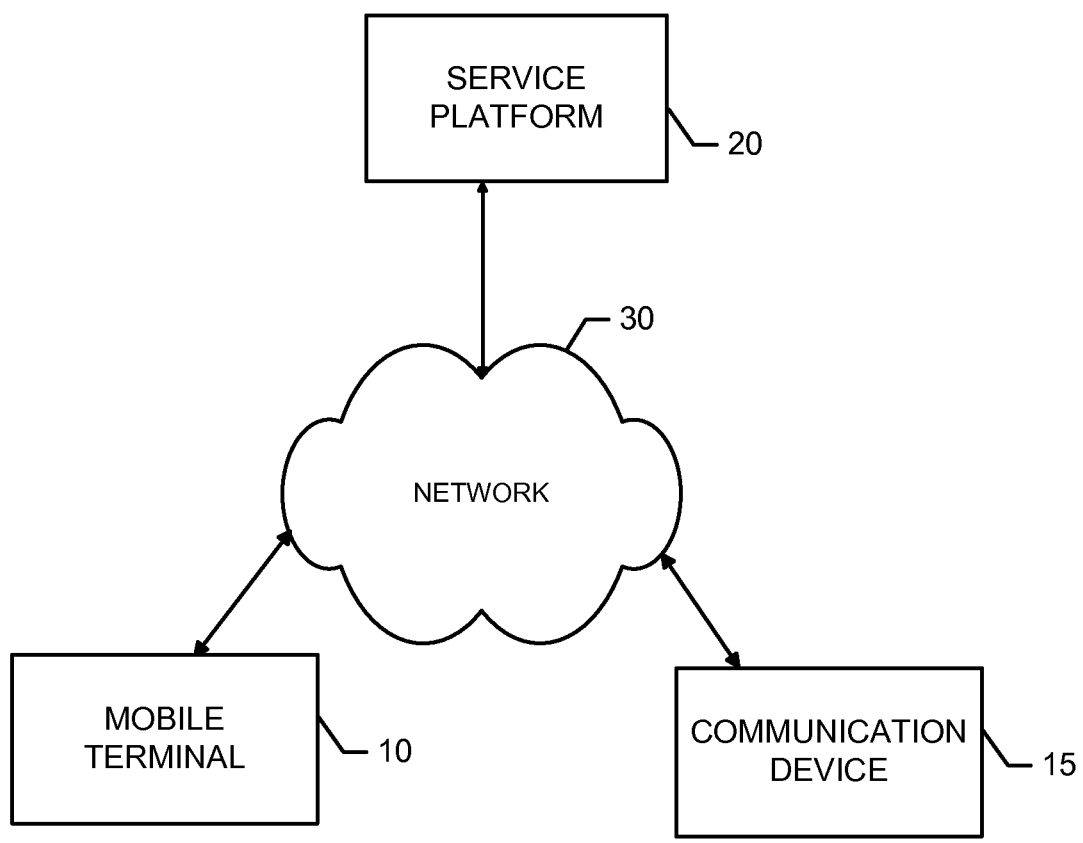
Figure 2:
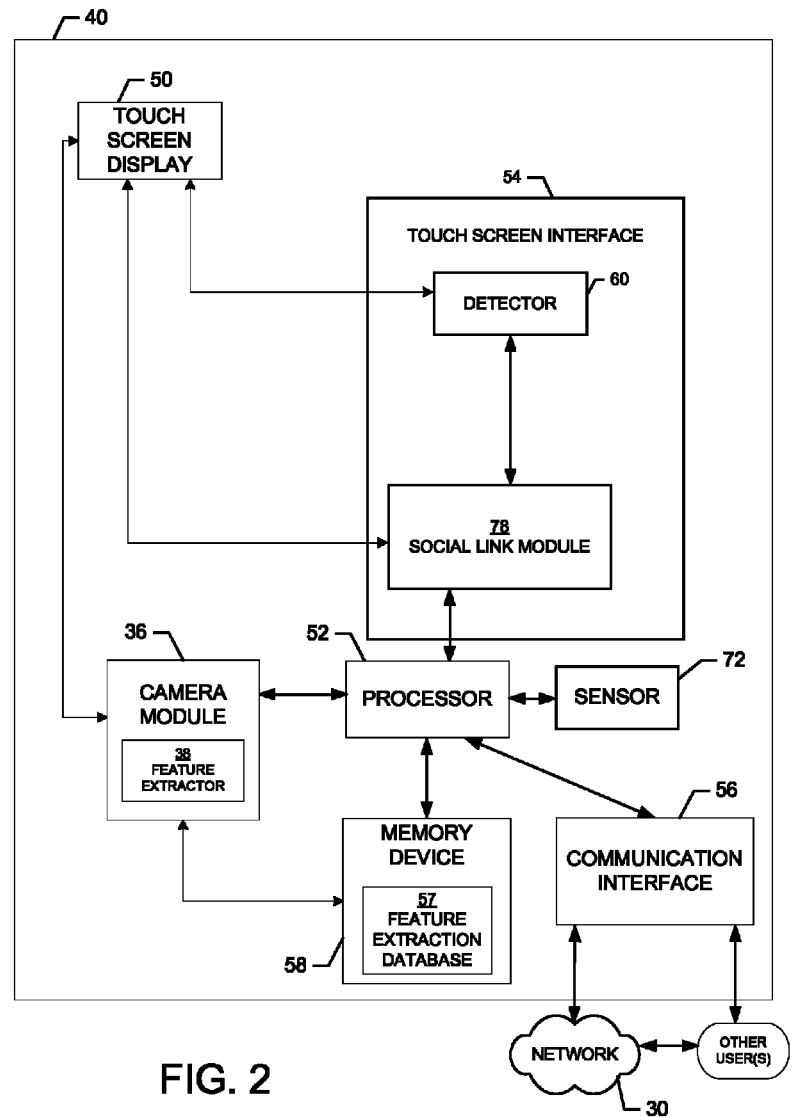
Figure 3:
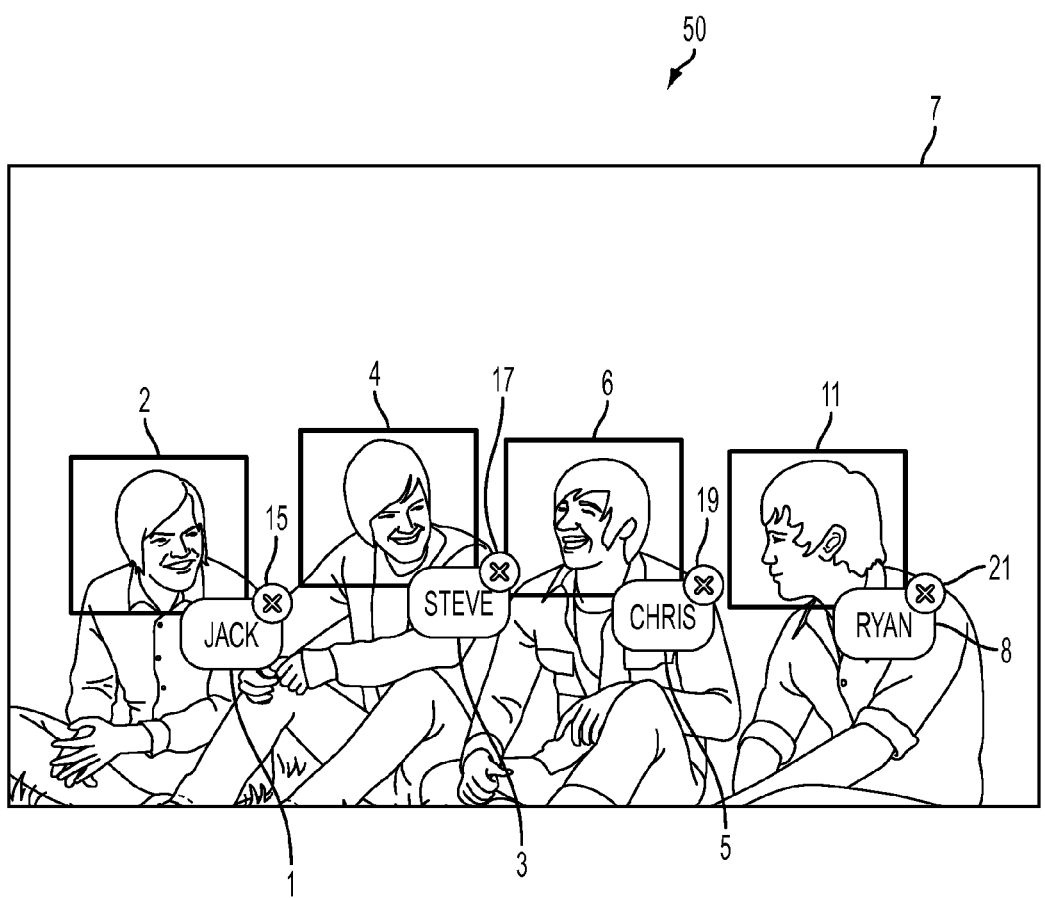
Figure 4:
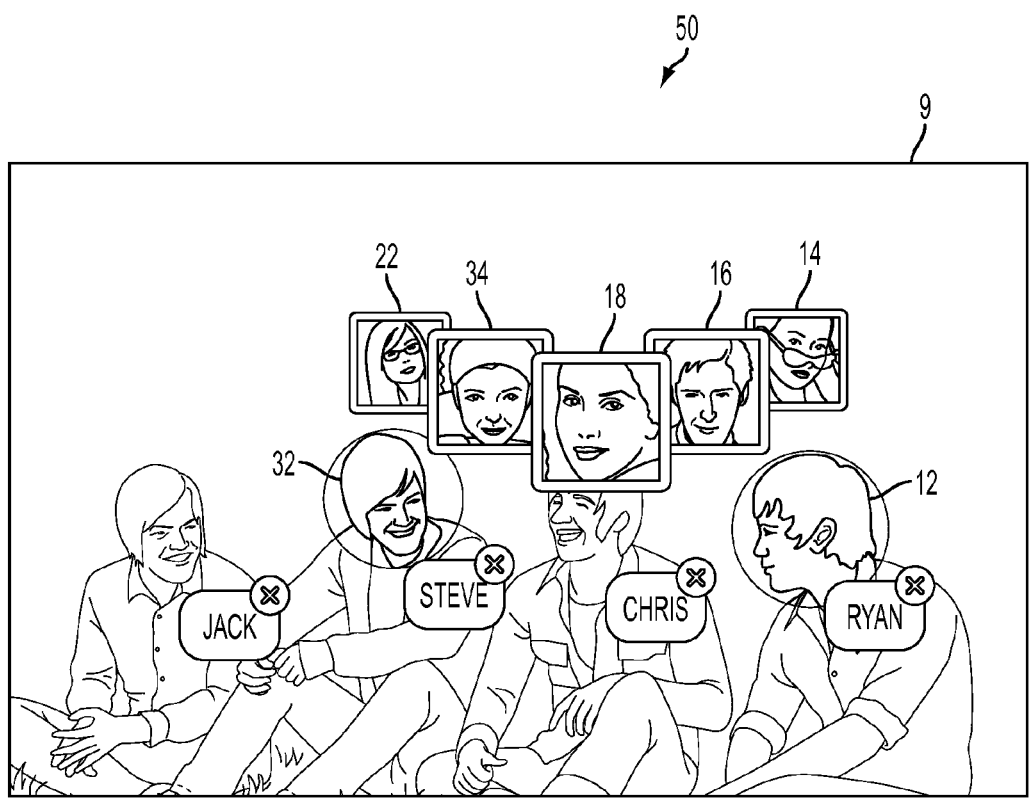
Figure 5:
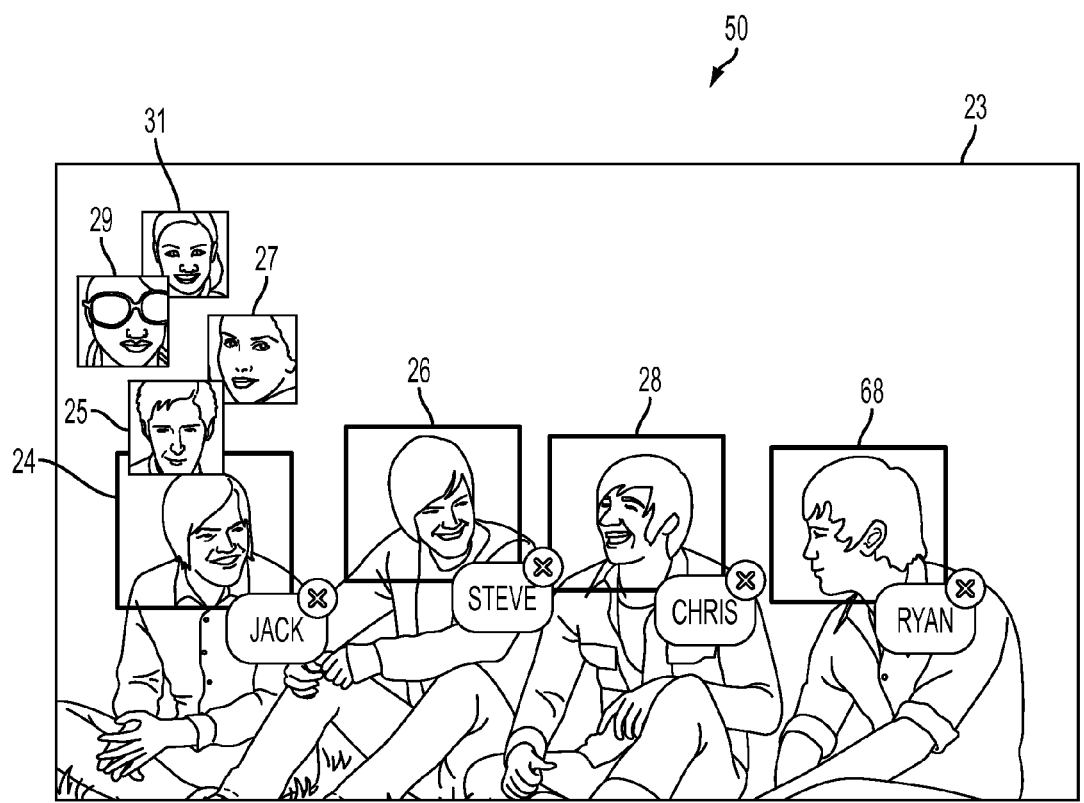
Figure 6:
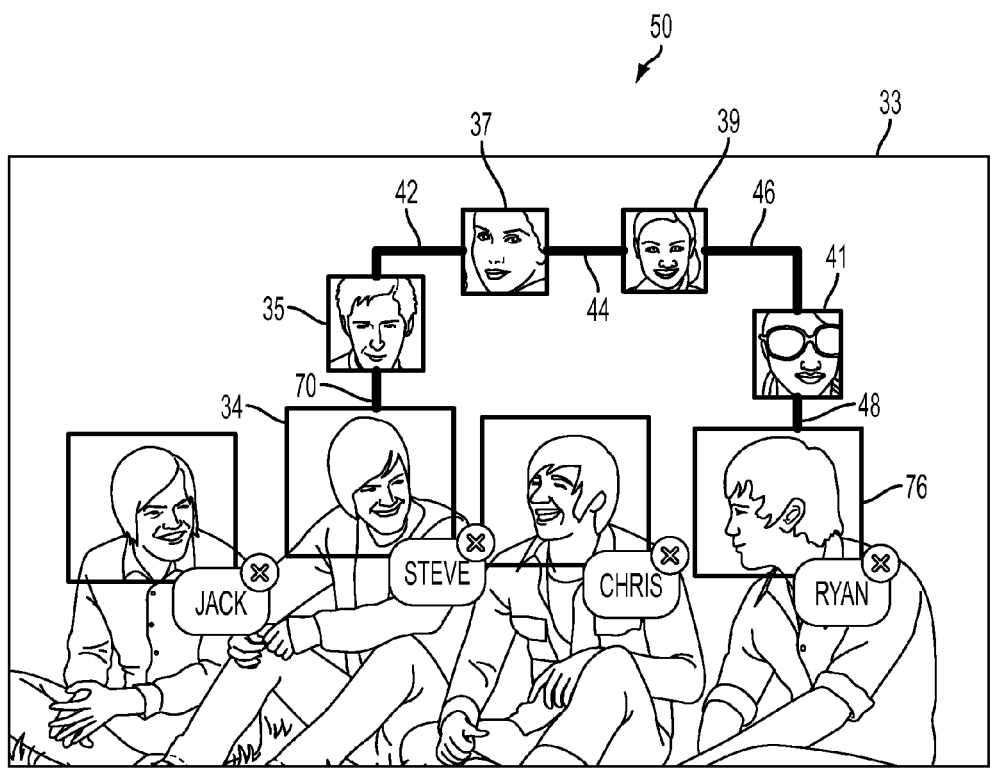
Figure 7:
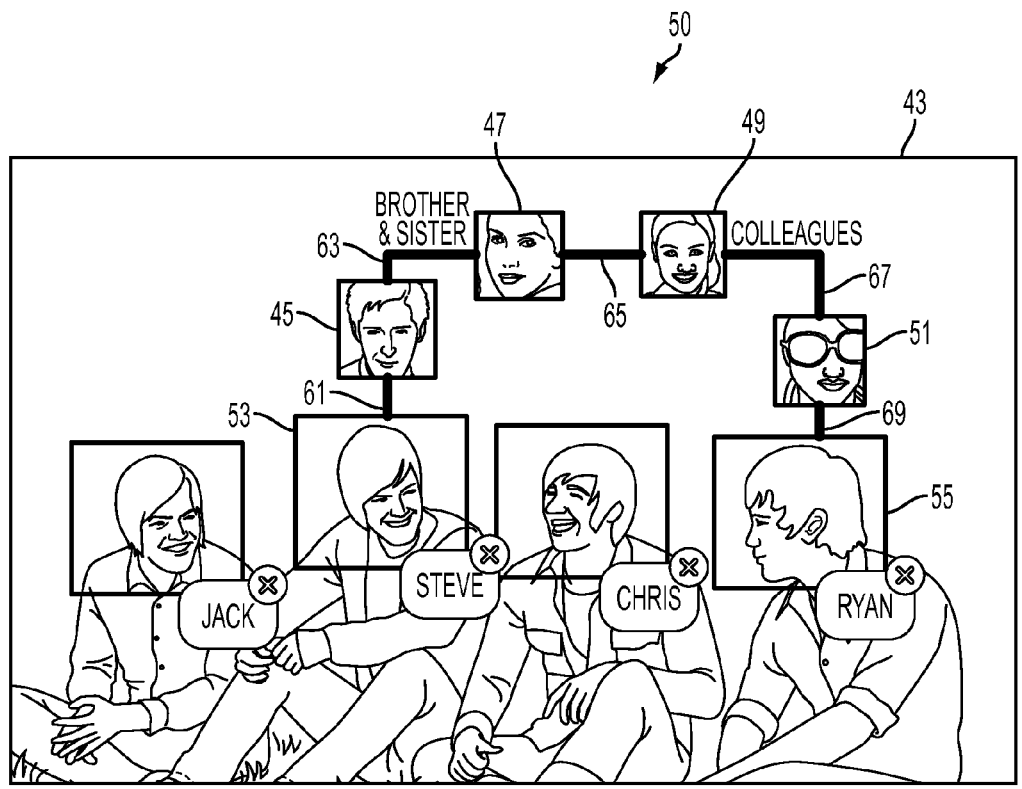
Figure 8:
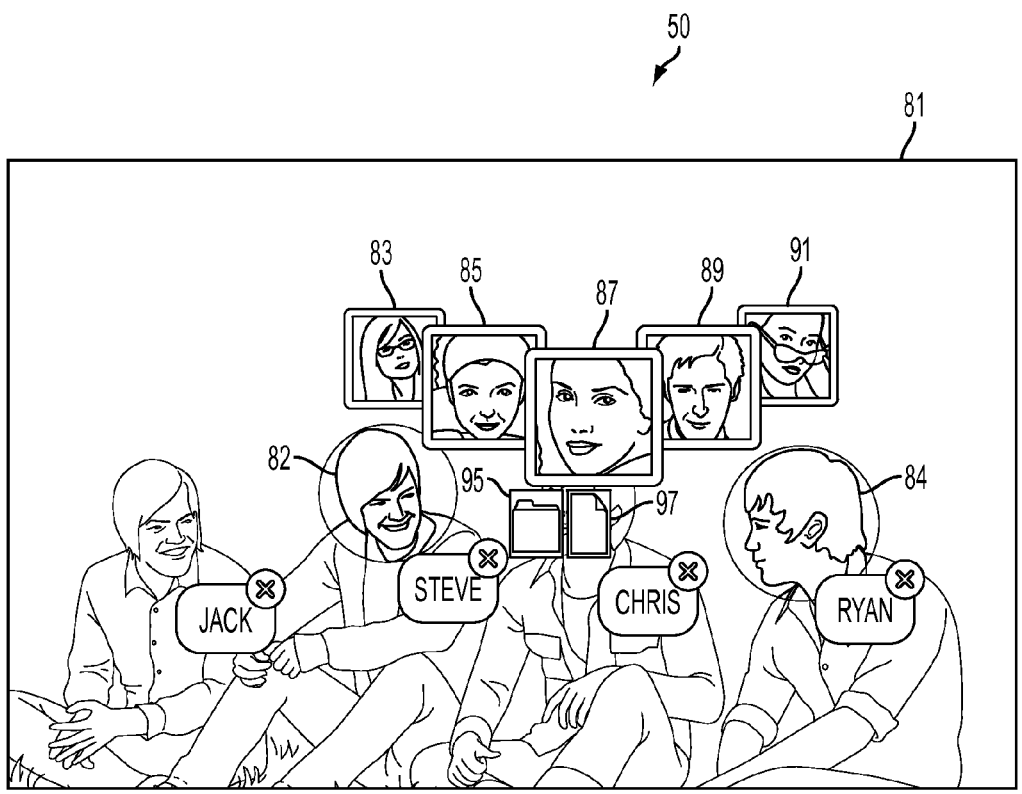
Figure 9:
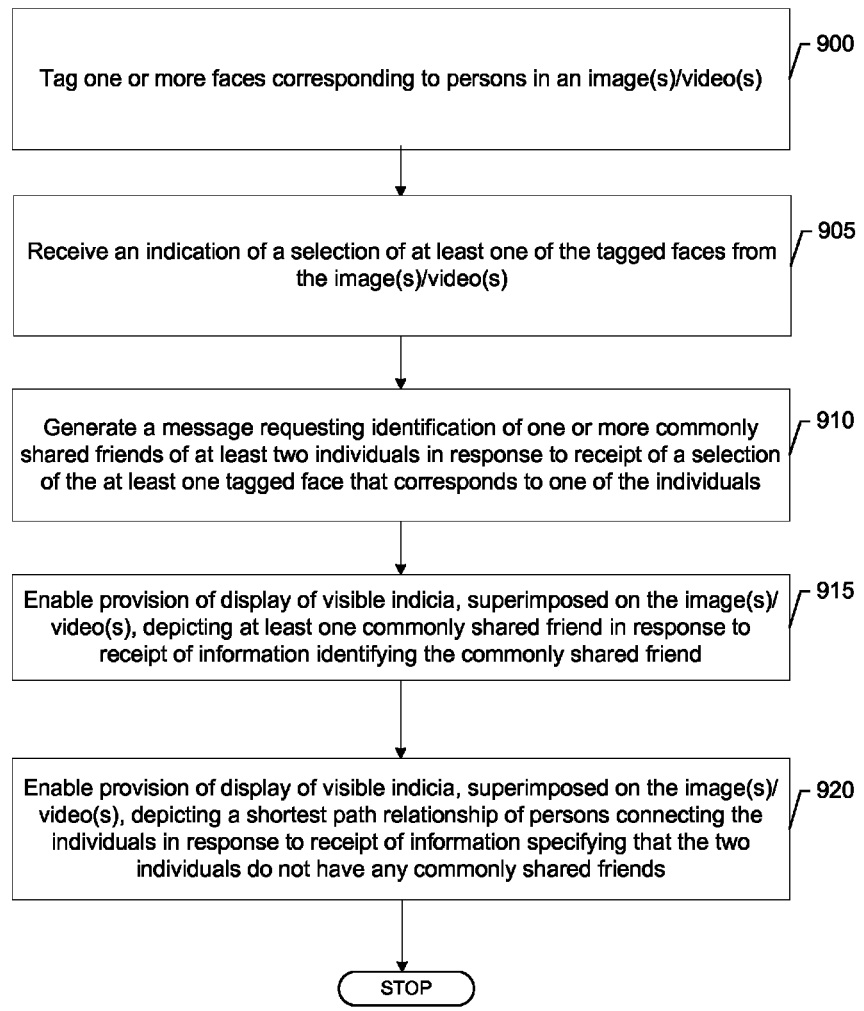

Having thus described certain example embodiments of the invention in general terms, reference will now be made to the accompanying drawings, which are not necessarily drawn to scale, and wherein:

FIG. 1 is a schematic block diagram of a system according to an example embodiment of the invention;

FIG. 2 is a schematic block diagram of an apparatus according to an example embodiment of the invention;

FIG. 3 is a diagram illustrating tagged faces of an image associated with contact names of individuals according to an example embodiment of the invention;

FIG. 4 is a diagram illustrating commonly shared friends of selected individuals according to an example embodiment of the invention;

FIG. 5 is a diagram illustrating commonly shared friends of individuals according to an alternative example embodiment of the invention;

FIG. 6 is a diagram illustrating a shortest relationship path between people that may not have commonly shared friends according to an example embodiment of the invention;

FIG. 7 is a diagram illustrating a description associated with links identifying the manner in which people know each other according to an example embodiment of the invention;

FIG. 8 is a diagram illustrating one or more commonly shared friends and shared content of individuals according to an example embodiment; and FIG. 9 illustrates a flowchart for providing a user-friendly, efficient and reliable manner in which to determine shared friends of individuals according to an example embodiment of the invention.

DETAILED DESCRIPTION

Some embodiments of the invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Moreover, the term "exemplary", as used herein, is not provided to convey any qualitative assessment, but instead merely to convey an illustration of an example. Thus, use of any such terms should not be taken to limit the spirit and scope of embodiments of the invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein an "image(s)" may, but need not, be a two-dimensional or three dimensional picture, photograph, screen display or the like captured by a device (e.g., a camera module 36). A "video(s)" may, but need not, be a sequence of still images depicting one or more scenes that are in motion.

FIG. 1 illustrates a block diagram of a system that may benefit from an embodiment of the invention. It should be understood, however, that the system as illustrated and hereinafter described is merely illustrative of one system that may benefit from an example embodiment of the invention and, therefore, should not be taken to limit the scope of embodiments of the invention. As shown in FIG. 1, an embodiment of a system in accordance with an example embodiment of the invention may include a mobile terminal 10 capable of communication with numerous other devices including, for example, a service platform 20 via a network 30. In one embodiment of the invention, the system may further include one or more additional communication devices (e.g., communication device 15) such as other mobile terminals, personal computers (PCs), servers, network hard disks, file storage servers, and/or the like, that are capable of communication with the mobile terminal 10 and accessible by the service platform 20. However, not all systems that employ an embodiment of the invention may comprise all the devices illustrated and/or described herein. Moreover, in some cases, an embodiment may be practiced on a standalone device independent of any system.

The mobile terminal 10 may be any of multiple types of mobile communication and/or computing devices such as, for example, portable digital assistants (PDAs), pagers, mobile televisions, mobile telephones, gaming devices, wearable devices, head mounted devices, laptop computers, cameras, camera phones, video recorders, audio/video players, radios, global positioning system (GPS) devices, or any combination of the aforementioned, and other types of voice and text communications systems. The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30.

Although not necessary, in some embodiments, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE), LTE advanced (LTE-A) and/or the like. Thus, the network 30 may be a cellular network, a mobile network and/or a data network, such as a Local Area Network (LAN), a Metropolitan Area Network (MAN), and/or a Wide Area Network (WAN), e.g., the Internet. In turn, other devices such as processing elements (e.g., personal computers, server computers or the like) may be included in or coupled to the network 30. By directly or indirectly connecting the mobile terminal 10 and the other devices (e.g., service platform 20, or other mobile terminals or devices such as the communication device 15) to the network 30, the mobile terminal 10 and/or the other devices may be enabled to communicate with each other, for example, according to numerous communication protocols, to thereby carry out various communication or other functions of the mobile terminal 10 and the other devices, respectively. As such, the mobile terminal 10 and the other devices may be enabled to communicate with the network 30 and/or each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as Wireless LAN (WLAN), Worldwide Interoperability for Microwave Access (WiMAX), WiFi, Ultra-Wide Band (UWB), Wibree techniques and/or the like and fixed access mechanisms such as Digital Subscriber Line (DSL), cable modems, Ethernet and/or the like.

In an example embodiment, the service platform 20 may be a device or node such as a server or other processing element. The service platform 20 may have any number of functions or associations with various services. As such, for example, the service platform 20 may be a platform such as a dedicated server (or server bank) associated with a particular information source or service (e.g., a service associated with sharing user interface settings), or the service platform 20 may be a backend server associated with one or more other functions or services. As such, the service platform 20 represents a potential host for a plurality of different services or information sources. In one embodiment, the functionality of the service platform 20 is provided by hardware (e.g., a processor, memory, etc.) and/or software components configured to operate in accordance with known techniques for the provision of information to users of communication devices. However, at least some of the functionality provided by the service platform 20 may be data processing and/or service provision functionality provided in accordance with an example embodiment of the invention. In one example embodiment of the invention, the service platform 20 may provide the mobile terminal 10 and/or the communication device 15 with information indicating one or more friends that individuals commonly share. In another example embodiment, the service platform 20 and/or the communication device 15 may provide the mobile terminal 10 with information indicating one or more friends that individuals commonly share.

In an example embodiment, the mobile terminal 10 may employ an apparatus (e.g., the apparatus of FIG. 2) capable of employing an embodiment of the invention. Moreover, the communication device 15 may also implement an embodiment of the invention. In one example embodiment, the communication device 15 may be a device or node such as a server or other processing element. In this regard, the communication device 15 may provide the mobile terminal 10 with information indicating one or more friends that individuals commonly share.

Referring now to FIG. 2, an apparatus 40 may include or otherwise be in communication with a touch screen display 50, a processor 52, a touch screen interface 54, a communication interface 56, a memory device 58, a sensor 72, a detector 60, a camera module 36 and a social link module 78. The memory device 58 may be configured to store information, data, files applications, instructions or the like for enabling the apparatus to carry out various functions in accordance with an example embodiment of the invention. The memory device 58 may include, for example, volatile and/or non-volatile memory. For example, the memory device 58 may be an electronic storage device (e.g., a computer readable storage medium) comprising gates configured to store data (e.g., bits) that may be retrievable by a machine (e.g., a computing device like processor 52). In an example embodiment, the memory device 58 may be a tangible memory device that is not transitory. The memory device 58 could be configured to buffer input data for processing by the processor 52. Additionally or alternatively, the memory device 58 could be configured to store instructions for execution by the processor 52. As yet another alternative, the memory device 58 may be one of a plurality of databases that store information and/or media content (e.g., pictures, images, videos, etc.). The memory device 58 may include a feature extraction database 57 that may be configured to store information, content, data or the like associated with facial features (e.g., eyes, nose, cheeks, jaws, lips, etc.) corresponding to one or more persons. The facial features stored in the feature extraction database 57 may be detected from one or more images, videos or the like of respective persons.

The apparatus 40 may, in one embodiment, be a mobile terminal (e.g., mobile terminal 10) or a fixed communication device or computing device configured to employ an example embodiment of the invention. However, in one embodiment, the apparatus 40 may be embodied as a chip or chip set. In other words, the apparatus 40 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 40 may therefore, in some cases, be configured to implement an embodiment of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 52 may be embodied in a number of different ways. For example, the processor 52 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 52 may be configured to execute instructions stored in the memory device 58 or otherwise accessible to the processor 52. As such, whether configured by hardware or software methods, or by a combination thereof, the processor 52 may represent an entity (e.g., physically embodied in circuitry) capable of performing operations according to an embodiment of the invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the algorithms and operations described herein when the instructions are executed. However, in some cases, the processor 52 may be a processor of a specific device (e.g., a mobile terminal or network device) adapted for employing an embodiment of the invention by further configuration of the processor 52 by instructions for performing the algorithms and operations described herein. The processor 52 may include, among other things, a clock, an arithmetic logic unit (ALU) and logic gates configured to support operation of the processor 52.

In an example embodiment, the processor 52 may be configured to operate a connectivity program, such as a browser, Web browser or the like. In this regard, the connectivity program may enable the apparatus 40 to transmit and receive Web content, such as for example location-based content or any other suitable content, according to a Wireless Application Protocol (WAP), for example. It should be pointed out that the processor 52 may also be in communication with the touch screen display 50 and may instruct the display to illustrate any suitable information, data, content (e.g., media content) or the like.

Meanwhile, the communication interface 56 may be any means such as a device or circuitry embodied in either hardware, a computer program product, or a combination of hardware and software that is configured to receive and/or transmit data from/to a network and/or any other device or module in communication with the apparatus 40. In this regard, the communication interface 56 may include, for example, an antenna (or multiple antennas) and supporting hardware and/or software for enabling communications with a wireless communication network (e.g., network 30). In fixed environments, the communication interface 56 may alternatively or also support wired communication. As such, the communication interface 56 may include a communication modem and/or other hardware/software for supporting communication via cable, Digital Subscriber Line (DSL), Universal Serial Bus (USB), Ethernet, High-Definition Multimedia Interface (HDMI) or other mechanisms. Furthermore, the communication interface 56 may include hardware and/or software for supporting communication mechanisms such as Bluetooth, Infrared, Ultra-Wideband (UWB), WiFi and/or the like.

The apparatus 40 may include a media capturing element, such as camera module 36. The camera module 36 may include a camera, video and/or audio module, in communication with the processor 52 and the touch screen display 50. The camera module 36 may be any means for capturing an image, video and/or audio for storage, display or transmission. For example, the camera module 36 may include a digital camera capable of forming a digital image file from a captured image. As such, the camera module 36 may include all hardware, such as a lens or other optical component(s), and software necessary for creating a digital image file from a captured image. Alternatively, the camera module 36 may include only the hardware needed to view an image, while a memory device (e.g., memory device 58) of the apparatus 40 stores instructions for execution by the processor 52 in the form of software necessary to create a digital image file from a captured image. In an example embodiment, the camera module 36 may further include a processing element such as a co-processor which assists the processor 52 in processing image data and an encoder and/or decoder for compressing and/or decompressing image data. The encoder and/or decoder may encode and/or decode according to a Joint Photographic Experts Group, (JPEG) standard format or another like format. In some cases, the camera module 36 may provide live image data to the touch screen display 50. In this regard, the camera module 36 may facilitate or provide a camera view to the touch screen display 50 to show live image data, still image data, video data, or any other suitable data. Moreover, in an example embodiment, the touch screen display 50 may be located on one side of the apparatus 40 and the camera module 36 may include a lens positioned on the opposite side of the apparatus 40 with respect to the touch screen display 50 to enable the camera module 36 to capture images on one side of the apparatus 40 and present a view of such images to the user positioned on the other side of the apparatus 40. In an example embodiment, the camera module 36 may capture images 7, 9, 23, 33, 43, and 81 of FIGS. 3, 4, 5, 6, 7 and 8, respectively. The images may be shown on the touch screen display 50.

The camera module 36 may include a feature extractor 38 that is capable of identifying and/or authenticating one or more persons from a digital image, video or the like. The feature extractor 38 may be embodied as any means such as a device or circuitry embodied in hardware, software or a combination of hardware and software that is configured to perform corresponding functions of the feature extractor 38. In this regard, the feature extractor 38 may detect facial features of persons in a digital image or video and may compare the detected facial features (e.g., eyes, nose, cheeks, jaws, etc.) to facial features stored in the feature extraction database 57. The facial features in the feature extraction database 57 may relate to detected facial features of one or more persons previously captured in one or more images or videos by the camera module 36. The facial features in the feature extraction database 57 may be associated with information that identifies a respective person whose facial features correspond to the facial features of the feature extraction database 57. The information identifying the respective person may be associated with corresponding facial features by tagging one or more persons in an image or video.

For instance, a user of the apparatus 40 may tag one or more persons in the images or videos by utilizing a finger, pointing device (e.g., stylus, pen, pencil, mouse, etc.), gaze, brain controlled input or the like to select a person's face in a respective image/video. In response to receipt of information indicating that a person in an image/video is selected, the processor 52 may capture facial features of the selected person which may be saved in the feature extraction database 57 and may generate and enable display of a prompt (e.g., text box) requesting the user to input information into the prompt about the selected person. In this regard, the user may input information in the prompt specifying a name of the selected person, an age of the selected person, a relationship (e.g., friend, relative, coworker, manager, etc.) to the selected person and any other suitable information and this information may be associated, by the processor 52, with the captured facial features and stored in the feature extraction database 57. It should be pointed out that when one or more persons are tagged in a respective image(s) or video(s) all or a portion of the identifying information input (e.g., a name) by the user of the apparatus 40 may be shown via the touch screen display 50. For example, when the image(s) or video(s) is being shown by the touch screen display 50, the processor 52 may enable display of the identifying information to be shown superimposed on the image/video related to the respective person(s).

The processor 52 may utilize the information in the feature extraction database 57 to determine whether facial features previously detected in an image(s) or video(s) captured or received by the apparatus 40 correspond to a particular person in a newly received/captured image(s) or video(s). For instance, the feature extractor 38 may identify a person's face by extracting features from an image(s) or video(s) of a respective person's face such as, for example, a size, position, shape of a nose, eyes, cheeks, jaw, etc. and may compare these extracted features to previously detected facial features in the feature extraction database 57. When the feature extractor 38 determines that there is a match between the extracted features and facial features in the feature extraction database 57, the feature extractor 38 may provide information to the processor 52 indicating that the extracted features match facial features in the feature extraction database 57. In this regard, the processor 52 may utilize the information indicating that the extracted features match the facial features in the feature extraction database 57 to determine that detected facial features in an image or video currently being examined corresponds to a respective person(s) previously detected in an image or video captured or received by the apparatus 40.

When the processor 52 determines that the extracted features match facial features in the feature extraction database 57, the processor 52 may automatically tag the respective person(s) detected in the image(s) or video(s) and may link the information input (e.g., name of the person, age of the person, relationship to the person, etc.) in the prompt by the user to the respective person(s) in the image(s) or video(s) such that the information is associated with the respective person(s). By automatically tagging a respective person(s) in a corresponding image(s) or video(s), which may be newly received or captured by the apparatus 40, all or a portion of the identifying information input (e.g., a name) by the user of the apparatus 40 may be shown via the touch screen display 50. For example, when the newly received or captured image(s) or video(s) is being shown by the display 50, the processor 50 may enable display of the identifying information to be shown superimposed on the image of the respective person(s).

The touch screen display 50 may be configured to enable touch recognition by any suitable technique, such as resistive, capacitive, infrared, strain gauge, surface wave, optical imaging, dispersive signal technology, acoustic pulse recognition, or other like techniques. The touch screen interface 54 may be in communication with the touch screen display 50 to receive indications of user inputs at the touch screen display 50 and to modify a response to such indications based on corresponding user actions that may be inferred or otherwise determined responsive to the indications. In this regard, the touch screen interface 54 may be any device or means embodied in either hardware, software, or a combination of hardware and software configured to perform the respective functions associated with the touch screen interface 54 as described below. In an example embodiment, the touch screen interface 54 may be embodied in software as instructions that are stored in the memory device 58 and executed by the processor 52. Alternatively, the touch screen interface 54 may be embodied as the processor 52 configured to perform the functions of the touch screen interface 54. Additionally, in an example embodiment, a screen of the touch screen display 50 may be controlled by moving a finger, pointing device or the like on top of the screen surface of the touch screen display 50 without actually touching the screen and different gestures may be used to select faces on images/videos.

The touch screen interface 54 may be configured to receive an indication of an input in the form of a touch event at the touch screen display 50. Following recognition of the touch event, the touch screen interface 54 may be configured to thereafter determine a stroke event or other input gesture and provide a corresponding indication on the touch screen display 50 based on the stroke event. In this regard, for example, the touch screen interface 54 may include a detector 60 to receive indications of user inputs in order to recognize and/or determine a touch event based on each input received at the detector 60.

In an example embodiment, one or more sensors (e.g., sensor 72) may be in communication with the detector 60. The sensors may be any of various devices or modules configured to sense one or more conditions. In this regard, for example, a condition(s) that may be monitored by the sensor 72 may include pressure (e.g., an amount of pressure exerted by a touch event) and any other suitable parameters.

A touch event may be defined as a detection of an object, such as a stylus, finger, pen, pencil or any other pointing device, coming into contact with a portion of the touch screen display in a manner sufficient to register as a touch. In this regard, for example, a touch event could be a detection of pressure on the screen of touch screen display 50 above a particular pressure threshold over a given area. Subsequent to each touch event, the touch screen interface 54 (e.g., via the detector 60) may be further configured to recognize and/or determine a corresponding stroke event or input gesture. A stroke event (which may also be referred to as an input gesture) may be defined as a touch event followed immediately by motion of the object initiating the touch event while the object remains in contact with the touch screen display 50. In other words, the stroke event or input gesture may be defined by motion following a touch event thereby forming a continuous, moving touch event defining a moving series of instantaneous touch positions. The stroke event or input gesture may represent a series of unbroken touch events, or in some cases a combination of separate touch events. For purposes of the description above, the term immediately should not necessarily be understood to correspond to a temporal limitation. Rather, the term immediately, while it may generally correspond to relatively short time after the touch event in many instances, instead is indicative of no intervening actions between the touch event and the motion of the object defining the touch positions while such object remains in contact with the touch screen display 50. In this regard, it should be pointed out that no intervening actions cause operation or function of the touch screen. However, in some instances in which a touch event that is held for a threshold period of time triggers a corresponding function, the term immediately may also have a temporal component associated in that the motion of the object causing the touch event must occur before the expiration of the threshold period of time.

In an example embodiment, the detector 60 may be configured to communicate detection information regarding the recognition or detection of a stroke event or input gesture as well as a selection of one or more items of data (e.g., images, text, graphical elements, etc.) to a social link module 78. In one embodiment, the social link module 78 (along with the detector 60) may be a portion of the touch screen interface 54. In an example embodiment, the touch screen interface 54 may be embodied by a processor, controller of the like. Furthermore, the detector 60 may each be embodied as any means such as a device or circuitry embodied in hardware, software or a combination of hardware and software that is configured to perform corresponding functions of the detector 60, respectively.

In an example embodiment, the processor 52 may be embodied as, include or otherwise control the social link module 78. The social link module 78 may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or structure to perform the corresponding functions of the social link module 78 as described below. Thus, in an example in which software is employed, a device or circuitry (e.g., the processor 52 in one example) executing the software forms the structure associated with such means.

The social link module 78 may communicate with the detector 60. The social link module 78 may receive an indication of a selection from the detector 60 indicating that a user of the apparatus 40 selected one or more persons tagged in an image, video or the like. In response to selection of the tagged persons (also referred to herein as tagged faces) in the image, video or the like the social link module 78 may retrieve data indicating commonly shared friends of the selected tagged persons. This data may be retrieved, by the social link module 78, from data stored in the memory device 58 and/or remotely from one or more social network services (e.g., Twitter™, Facebook™, MySpace™, LinkedIn™, Ovi Service™, etc.) as described more fully below. In response to receipt of the common friends of the selected tagged persons in the image, video or the like, the social link module 78 may enable provision of display of information indicative of the common friends on the respective image, video or the like. The information indicative of the common friends may be names of the respective common friends, an image of the respective common friends or any other suitable visible indicia that serves to indicate or identify a common friend(s). In this regard, the social link module 78 may enable provision of display via the touch screen display 50 of the common friends superimposed on the respective image, video, or the like from which the tagged persons were selected.

The social link module 78 may enable provision of display of information indicative of people in a shortest relationship path associated with tagged persons selected from an image, video or the like even in an instance in which the selected tagged persons may not directly have friends in common with each other, as described more fully below.

The social link module 78 may also enable provision of display of information indicative of common friends of one or more tagged persons that may be selected from an image, video or the like and a user of the apparatus 40. In this regard, the social link module 78 may enable provision of display, via the touch screen display 50, of the information indicative of the common friends of the user of the apparatus 40 and the selected person(s) superimposed on the respective image, video, or the like from which the tagged person(s) were selected. The information indicative of the common friends may be names of the respective common friends, an image of the respective common friends or any other suitable visible indicia that serves to indicate or identify a common friend. The social link module 78 may enable display of the common friends of the user of the apparatus 40 and the selected tagged person(s) superimposed on the respective image, video or the like, via the touch screen display 50, in an area proximate to the selected tagged person(s). In this regard, display of the common friends may visibly indicate a linkage to the selected tagged person(s) and the user. Additionally or alternatively, the social link module 78 may enable provision of audio data indicative of commonly shared friends of one or more tagged persons that may be selected from an image, video, or the like. The social link module 78 may enable provision of the audio data by instructing a speaker(s) (not shown) of the apparatus 40 or the audio module of the camera module 36 to execute or play the audio data.

It should be pointed out that in alternative example embodiment, the social link module 78 may link one or more faces on an image or video to corresponding persons in a contacts book of the apparatus 50. The social link module 78 may link one or more faces on an image or video to persons identified in a contacts book when a corresponding face(s) in an image or video of the contacts book matches a face(s) in the image(s) or video(s). Additionally or alternatively, linkage may be generated directly by a network device(s) maintaining any available social network service having stored contacts data.

Referring now to FIG. 3, a diagram illustrating an image in which individuals are tagged with contact names according to an example embodiment is provided. The image 7 may be shown via the touch screen display 50. The user of the apparatus 40 may manually tag each person in the image 7 such that each person is associated with identifying information (e.g., a name). In this regard, the user may utilize a finger, pointing device or the like to select a person's face via the image and in response to the detector 60 receiving an indication that the person's face is selected, the processor 52 may generate a prompt (e.g., a text box, etc.) provided to the touch screen display 50 enabling the user to input information identifying 5 (also referred to herein as identifying information) the person (e.g., Chris) which may create a tag. The information identifying 5 persons in the image may include, but is not limited to, a name of the person, an age of the person, a relationship to the person, the strength of relationship to the person, etc.

In response to the user entering the identifying information via the prompt, the processor 52 may associate and link the identifying information to the face of the respective person to generate a tag for the person. The association between the image of the person's face and the identifying information may be stored by the processor 52 in the feature extraction database 57 and the processor 52 may enable display of the identifying information (e.g., a name (e.g., "Jack")) superimposed on at least a portion of the image of the respective person (e.g., Jack). As shown in FIG. 3, the identifying information 1, 3, 5, 8 may be shown associated with a geometrical objects 2, 4, 6, 11 (e.g., squares) around the face of the person and a corresponding button (e.g., buttons 15, 17, 19 and 21). In one example embodiment, selection by a pointer or the like inside a geometrical object 2, 4, 6, 11 may enable selection of the corresponding person. On the other hand, selection of a button(s) (e.g., button 15) may disable selection of the corresponding person (e.g., Jack). In the example embodiment of FIG. 3, this process may be repeated for generating tags for other persons (e.g., Steve, Chris and Ryan) in the image 7.

In an alternative example embodiment, the processor 52 may automatically generate the tags corresponding to each of the persons in image 7 in response to determining that the extracted facial features (e.g., features associated with a nose, eyes, lips, cheeks, jaws, etc.) of the faces of persons in the image 7 correspond to matching facial features in the feature extraction database 57. As such, the processor 52 may utilize the identifying information (e.g., a name) associated with matched facial features in the feature extraction database 57 to generate the tags. For instance, the processor 52 may tag a respective image of a person's face in the image 7 with a name (e.g., Jack) of a person that is associated with the facial features in the feature extraction database 78 that match the extracted facial features of the respective person (e.g., Jack).

Referring now to FIG. 4, a diagram illustrating common friends of tagged persons selected from an image according to an example embodiment is provided. In the example of FIG. 4, a user may utilize a finger, pointing device or the like to select the tagged images (also referred to herein as tagged faces) corresponding to Steve and Ryan. The selection of the tagged images corresponding to Steve and Ryan may occur in a simultaneous manner. In this regard, the detector 60 may detect that the user utilized a finger, pointing device or the like to select the tagged images 32, 12 corresponding to Steve and Ryan at the same time. Alternatively, the detector 60 may detect that the user selected one of the tagged images first (e.g., the tagged image 32 corresponding to Steve) and subsequently selected another tagged image (e.g., the tagged image 12 corresponding to Ryan). It should be pointed out that the user may select the tagged images 32, 12 corresponding to Steve and Ryan in any suitable manner without departing from the spirit and scope of the invention.

In response to the social link module 78 receiving indications from the detector 60 that the user selected the tagged images 32, 12 corresponding to Steve and Ryan, the social link module 78 may communicate with one or more network devices, such as, for example servers (e.g., service platform 20, communication device 15) providing social network services. In this regard, the social link module 78 may generate and send a message to one or more network devices providing social network services requesting the network devices to send the social link module 78 information identifying one or more friends that both Steve and Ryan commonly share. Examples of social network services that the social link module 78 may communicate with via the network devices include, but are not limited to, Facebook™, Twitter™, LinkedIn™, Ovi Service™, MySpace™, etc. In one alternative example embodiment, the social link module 78 may enable the touch screen display 50 to show which of the social network services provided the linkage between certain friends or contacts. For example, based of receipt, by the social link module 78, of data from Facebook™ the social link module 78 may determine that one or more friends are common to Steve and Ryan, etc. These social network services may store information identifying connections between friends, family members, coworkers, etc. in profile data of users. The social link module 78 may communicate with the network devices providing the social network services via network 30. In the example of FIG. 4, it should be pointed out that the network devices (e.g., service platform 20, communication device 15) may determine whether Steve and Ryan have an account with the social network services and if so, the network devices may access information (e.g., data in a profile(s)) in a memory device or the like to determine friends that are connected or linked to both Steve and Ryan. In this manner, the network devices may send the social link module 78 information (e.g., images and/or names of the corresponding friends) pertaining to the commonly shared friends of both Steve and Ryan. In an instance in which a network device providing a social network service(s) does not identify any commonly shared friends of both Steve and Ryan, the network device may send a message to the social link module 78 indicating that no shared friends were identified.

In the example of FIG. 4, the social link module 78 may receive a response from one of the network devices (e.g., service platform 20) providing social network services such as, for example, Facebook™ indicating that both Steve and Ryan share five friends in common with each other. In this regard, the network device providing the social network service (e.g., Facebook™) may send the social link module 78 information identifying the shared friends of Steve and Ryan. The information identifying the shared friends may indicate a number of times the shared friends have communicated with selected tagged persons (e.g., Steve and Ryan). The data associated with the number of times the shared friends have communicated with selected tagged persons may be utilized by the social link module 78 to determine an importance of a friend(s) or the strength of relationship of a friend(s) to selected tagged persons, as described more fully below. It should be pointed out that any other suitable mechanism may be used to determine strength of relationship between friends and a selected tagged person(s) such as for example analyzing data associated with a number of calls between the friend(s) and the selected tagged person(s), an amount of images in which both the selected tagged person(s) and the shared friend(s) are tagged, etc.

Additionally, in one example embodiment, the information identifying the shared friends may include an image corresponding to each of the shared friends in an instance in which the shared friends have an image of themselves uploaded to their account with the social network service (e.g., Facebook™). In an alternative embodiment, the information identifying the shared friends may include a name of the shared friends in an instance in which the shared friends do not have an image of themselves uploaded to an account with the social network service.

In the example of FIG. 4, the information identifying the five shared friends provided to the social link module 78 may be visible indicia (also referred to herein as graphical elements) 14, 16, 18, 34 and 22 (e.g., images, thumbnails, icons, etc.) corresponding to information identifying each of the five shared friends. As shown in FIG. 4, in response to the receipt of the images of the five shared friends from the network device providing the social network service (e.g., Facebook™), the social link module 78 may enable display of the graphical elements 14, 16, 18, 34 and 22 corresponding to the five friends commonly shared by Steve and Ryan. In this regard, the social link module 78 may enable display of the graphical elements 14, 16, 18, 34 and 22 corresponding to the five friends superimposed on the image 9 and associated with the tagged images 32 and 12 corresponding to Steve and Ryan. For instance, in the example embodiment of FIG. 4, the graphical elements 14, 16, 18, 34 and 22 may be superimposed on image 9 slightly above and/or between the selections of the tagged images 32 and 12.

While the example embodiment of FIG. 4 illustrates that a user selected two tagged images corresponding to persons (e.g., Steve and Ryan) in the image 9, it should be pointed out that the user may select any number of tagged images (e.g., Steve, Ryan, Jack) corresponding to persons without departing from the spirit and scope of the invention. For purposes of illustration and not of limitation, if the user selected the tagged images corresponding to Steve, Ryan and Jack, the social link module 78 may receive information from one or more network devices providing social network services indicating that these tagged persons share one friend in common having an image corresponding to graphical element 18. Additionally, while the example above relates to the social link module 78 receiving a response from one of the network devices (e.g., service platform 20) providing social network services (e.g., Facebook™) it should be pointed out that in another example embodiment the social link module 78 may receive responses from multiple network devices (e.g., service platform 20, communication device 15) providing social network services (e.g., Facebook™, Twitter™). In this regard, the social link module 78 may determine that one or more of the shared friends are based on data received from one social network service (e.g., Facebook™) while others of the shared friends are based on data received from another social network service(s) (e.g., Twitter™ and/or LinkedIn™). As such, the social link module 78 may determine that one or more of the graphical elements (e.g., graphical elements 14, 16, 18) corresponding to friends is based on the information identifying shared friends from one social network service (e.g., Facebook™). On the other hand, the social link module 78 may determine that one or more other graphical elements (e.g., graphical elements 34 and 22) corresponding to shared friends is based on the information identifying shared friends from one or more other social network services (e.g., Twitter™ and/or LinkedIn™).

It should be pointed out that in response to receipt of the information identifying the shared friends from the network devices providing the social network services that the social link module 78 may generate data associated with the graphical elements 14, 16, 18, 34 and 22 to indicate one or more friends that are more important than other friends to Steve and Ryan or friends in which Steve and Ryan may have a stronger relationship.

The social link module 78 may denote more important friends or friends with a stronger relationship to selected tagged persons (e.g., Steve and Ryan) with a bigger image size, different font for name information or by highlighting a portion of an image corresponding to the friend(s) with a predetermined color (e.g., green) or shape. In the example of FIG. 4, the social link module 78 may determine that the friend corresponding to image 18 is more important or has a stronger relationship to both Steve and Ryan. In this regard, the social link module 78 may enable display of the graphical element 18, superimposed on image 9, with a size that is bigger than the size of graphical elements 14, 16, 34 and 22 corresponding to other friends. As such, the smaller sizes of graphical elements 14, 16, 34 and 22 may indicate a lower (e.g., weaker) level of friendship to corresponding friends than the friend associated with graphical element 18 having a bigger image size.

In an example embodiment, the social link module 78 may utilize the number of times that the selected tagged persons (e.g., Steve and Ryan) communicated with respective shared friends provided by the network device(s) to determine whether one or more shared friends are important or to indicate a strong relationship with the shared friend(s). For example, the social link module 78 may determine that one or more shared friends are important or that a relationship with one or more friends is strong in an instance in which the social link module 78 determines that communications by each of the selected tagged persons with one or more friends equal or exceed a predetermined threshold (e.g., 50 communications (e.g., messages)). When the social link module 78 determines that communications by each of the selected tagged persons with one or more friends is below the predetermined threshold, the social link module 78 may determine that the strength of the relationship is low or weak. In an instance in which there may be too many shared friends to be shown on the touch screen display 50, the social link module 78 may, but need not, show only the most important shared friends (e.g., in that context (e.g., time, location, etc.)).

In one example embodiment, in response to receipt of a selection of a tagged image(s) (e.g., images 32, 12) corresponding to a persons (e.g., Steve and Ryan), the social link module 78 may analyze data in a contact card(s) or the like stored in the memory device 58. The contact card(s) may be associated with the selected tagged persons (e.g., Steve and Ryan) and may include information indicating one or more social network services (e.g., Facebook™, Twitter™, LinkedIn™) that the selected tagged persons has an account with. In this regard, the social link module 78 may communicate with one or more network devices (e.g., service platform 20, communication device 15) providing the social network services that the selected tagged persons has an account with and may send the network devices a message or query requesting information identifying commonly shared friends of the selected tagged persons (e.g., Steve and Ryan). In response to receipt of the message or query, the network devices providing the social network services may send the social link module 78 the information identifying the commonly shared friends. As described above, this information may be visible indicia such as graphical elements (e.g., images, thumbnails, icons, etc.) corresponding to data identifying the shared friends of selected tagged persons (e.g., Steve and Ryan).

In one alternative example embodiment, a user may select a feature of the apparatus 40 to enable the social link module 78 to communicate with one or more specified social network services chosen by the user. For instance, a user of the apparatus 40 may utilize a finger, pointing device or the like to select one or more particular social network services (e.g., MySpace™, LinkedIn™) in which the social link module 78 is to communicate with for information identifying commonly shared friends of selected persons. The selection of the social network services chosen by the user may, but need not, be made by the user via a selection of the social network services in a menu, folder, list or the like or in any other suitable manner.

Referring now to FIG. 5, a diagram illustrating shared friends of a user of an apparatus and a selected tagged person according to an example embodiment is provided. In the example of FIG. 5, a user of the apparatus 40 may select one or more of the tagged images 24, 26, 28, and 68 corresponding to persons from an image 23 in order to identify commonly shared friends of the user and the person(s) corresponding to a selected tagged image(s). For instance, in the example embodiment of FIG. 5, in response to the detector 60 detecting that a user selected a tagged image 24 of Jack in a predetermined manner, the detector 60 may provide data to the social link module 78 indicating the selection. The selection of a tagged image(s) in the predetermined manner may, but need not, be a long press of one or more tagged images 24, 26, 28 and 68, or a detection of continuous movement from top to bottom or bottom to top of a tagged image, etc. A long press may relate to a user utilizing a finger, pointing device or the like to press a tagged image(s) for selection for a predetermined period of time (e.g., two seconds). In this regard, the selection of a tagged image(s) in a predetermined manner may serve as a trigger to the social link module 78 that the user is requesting information regarding friends that the user may commonly share with the person(s) corresponding to the selected tagged image(s).

In response to the social link module 78 receiving an indication from the detector 60 that the user selected the tagged image 24 in the predetermined manner, the social link module 78 may generate a message or query requesting one or more network devices providing social network services to identify commonly shared friends of Jack and the user of the apparatus 40. The network devices providing the social network services that the social link module 78 may send the message/query to may be based on one or more social network services (e.g., Facebook™, Twitter™) in which the user and Jack have an account with as identified by the social link module 78 in response to analyzing data in a contact card(s) or the like. Alternatively, the network devices providing the social network services that the social link module 78 may send the message/query to may be based on social network services chosen by the user in a manner analogous to that described above.

In response to receipt of information from the social network service identifying the commonly shared friends of the user of the apparatus 40 and Jack, the social link module 78 may enable display of graphical elements 25, 27, 29, and 31 corresponding to data identifying the commonly shared friends. The graphical elements 25, 27, 29 and 31 may be displayed by the social link module 78 superimposed on at least a portion of the image 23 that is associated with and linked to the tagged image 24. In one embodiment, a graphical element (e.g., graphical element 25) that is superimposed closest in proximity to a selected tagged image (e.g., tagged image 24) may denote an important friendship or strong relationship with the user and a person (e.g., Jack) corresponding to a selected tagged image(s). Graphical elements (e.g., graphical elements 27, 29, 31) further away from a selected tagged image(s) may denote a lower level of importance or weaker relationship with the user of the apparatus and a respective person (e.g., Jack) as opposed to a graphical element (e.g., graphical element 25) that is closest in proximity to the selected tagged image(s) (e.g., tagged image 24).

In an alternative example embodiment, the social link module 78 may send a message/request to social network services for common friends of the user and a corresponding person(s) based on a selection of a feature provided by the apparatus 40. In this alternative example embodiment, the selection of a tagged image(s) in the predetermined manner (e.g., a long press) may not be required to trigger the social link module 78 to send the message/request to the social network services for the commonly shared friends. Instead, the social link module may automatically send the message/request.

Referring now to FIG. 6, a diagram illustrating a shortest relationship path between two people that may not have commonly shared friends according to an example embodiment is provided. In the example embodiment of FIG. 6, the social link module 78 may receive information in a message from network devices (e.g., service platform 20, communication device 15) providing social network services that persons identified in a request sent by the social link module 78 do not have commonly shared friends. In an instance in which the information sent by the network devices to the social link module 78 contains data specifying that two or more people do not have commonly shared friends, the network devices may also include data in the message sent to the social link module 78 indicating a shortest relationship path in which the two or more people may be connected. In this regard, the shortest relationship path between two or more people may relate to individuals that each of the two people may not know directly but whom they may know or meet through someone else they may know.

For purposes of illustration and not of limitation consider FIG. 6 in which a user may select tagged images 34 and 76, from an image 33, corresponding to two persons such as Steve and Ryan. In this regard, the social link module 78 may send a message/request to a network device(s) (e.g., service platform 20) providing social network services (e.g., LinkedIn™) for information identifying commonly shared friends of Steve and Ryan. In response to receipt of the request, the network device(s) may search a memory (e.g., a profile in a database) to determine whether Steve and Ryan have commonly shared friends. In this example embodiment, the network device(s) may determine that Steve and Ryan do not have friends directly in common with one another. As such, the network device(s) may determine whether a shortest relationship path between Steve and Ryan may be determined which may connect Steve and Ryan indirectly through people that they may know.

In the example embodiment of FIG. 6, a network device(s) may determine that Steve and Ryan may be connected indirectly through four people. As such, the network device(s) providing the social network services (e.g., LinkedIn™) may send the social link module 78 a message including information indicating that Steve and Ryan do not share any friends in common. However, the information in the message may also include information identifying the shortest path of one or more persons that Steve and Ryan may be connected through indirectly. In this example, the network device may provide the social link module 78 with information specifying that Steve and Ryan may be connected indirectly via a shortest path of four people. Additionally, the information provided by the network device to the social link module 78 may include data identifying the four people. The data identifying the four people may include, but is not limited to, names of the people, images of the people, icons or thumbnails corresponding to images of the people or any other suitable data.

In response to receipt of the data identifying the four people, the social link module 78 may generate visible indicia such as graphical elements 35, 37, 39 and 41 (e.g., images, icons, thumbnails, etc.) corresponding to data identifying the four people and may superimpose these graphical elements 35, 37, 39 and 41 on the image 33 between the tagged images 34 and 76 corresponding to Steve and Ryan, respectively. The social link module 78 may also enable display of one or more links 70, 42, 44, 46, 48 between each of the four people with respect to each other as well as Steve and Ryan and the links 70, 42, 44, 46, 48 may be superimposed on at least a portion of the image 33. For instance, the social link module 78 may enable display of graphical element 35 corresponding to a person that is directly linked to Steve and graphical element 41 corresponding to a person that is directly linked to Ryan. The social link module may also enable display of the graphical element 35 corresponding to a person being directly linked to a person corresponding to graphical element 37 and graphical element 41 corresponding to a person being directly linked to a person corresponding to graphical element 39. Additionally, the social link module 78 may enable display of the graphical element 37 corresponding to a person being linked directly to the person corresponding to graphical element 39.

In an example embodiment, a user of the apparatus 40 may utilize a finger, pointing device or the like to select one or more of the graphical elements 35, 37, 39, 41. In response to the detector 60 providing an indication to the social link module 78 that one or more of the graphical elements are selected, the social link module 78 may generate a message enabling the user to generate a request. The request may be a friend request requesting the person (e.g., Kelly) corresponding to the selected graphical element (e.g., graphical element 41) to establish a connection with the user. The user may, but need not, utilize a virtual keyboard or the like of the touch screen interface 54 to explain how the user may know the person corresponding to the selected graphical element. The social link module 78 may send the request to a network device providing social network services which may maintain an account (e.g., social network account (e.g., email account)) on behalf of the person. Upon checking the message associated with the account, the person may accept or reject the request.

In an instance in which the user of the apparatus 40 is already connected to one or more of the persons corresponding to graphical elements 35, 37, 39 and 41, the user may select a graphical element(s) which may trigger the social link module 78 to generate a message. The user may utilize the virtual keyboard of the touch screen interface 54 to include data in the message requesting the person (e.g., Kelly) associated with the selected graphical element (e.g., graphical element 41) to introduce the user to a person (e.g., Ryan) that the user may not know directly, but that the person (e.g., Kelly) corresponding to the selected graphical element may know. The person may accept or reject this message, in a manner analogous to that described above.

In an alternative example embodiment, when a network device(s) providing social network services determines that selected persons (e.g., Steve and Ryan) do not directly have any commonly shared friends, the network device(s) may determine the shortest relationship path between the selected persons by evaluating data related to connected friends, family members and/or data related to an organization structure. This data may be tied to a profile of each individual registered with the social network services (e.g., Facebook™, Twitter™). For instance, a profile of an individual may specify friends that the individual is connected to, and may identify family members (e.g., a family tree) of the individual as well as the individual's position within an organization and may include data specifying the organization's structure. The data relating to the organization structure may relate to an organization chart that may define employee/management hierarchy. The profile may be stored in a memory device of the network(s) device.

By analyzing this data, the network device(s) may send the social link module 78 data indicating a shortest relationship path in which the selected people may be connected indirectly. In this alternative example embodiment, some of the persons corresponding to graphical elements 35, 37, 39 and 41 of FIG. 6 may, but need not, be friends, family members or coworkers of each other. As such, in response to selection of one or more of the graphical elements 35, 37, 39 and 41 (e.g., graphical element 37) the social link module 78 may enable display of the family members (e.g., siblings) and/or friends associated with the corresponding persons. Additionally, in response to selection of a graphical element(s) (e.g., graphical element 39), the social link module 78 may enable provision of display of one or more coworkers (e.g., a manager of the selected person and/or the manager's supervisor, etc.) of the person corresponding to the graphical element. The data associated with the coworkers may be retrieved by the module 78 from data corresponding to an organization structure.

As shown in FIG. 7, in one embodiment, the social link module 78 may include a description associated with the links 61, 63, 65, 67, 69 identifying the manner in which people know each other. The people may be associated with graphical elements 45, 47, 49, 51 and tagged images 53, 55. For purposes of illustration and not of limitation, the social link module 78 may include information superimposed on the image 43 indicating that the persons associated with graphical elements 45 and 47 know each other as brother and sister. The information indicating that the persons associated with graphical elements 45 and 47 know each other as brother and sister may be associated with link 63. Additionally, in this example, the social link module 78 may include information superimposed on the image 43 indicating that the persons associated with graphical elements 49 and 51 know each other as colleagues. It should be pointed out that the information indicating how the persons know each other may be provided to the social link module 78 by a network device providing social network services in response to receipt of a request from the social link module 78.

In one example embodiment, the social link module 78 may determine the strength of a linkage between people. The social link module 78 may determine the strength of the linkage based a number of communications between two people equaling or exceeding a predetermined threshold (e.g., 50 communications (e.g., messages)). For instance, when the social link module 78 determines that the communications between two people equals or exceed the predetermined threshold, the social link module 78 may determine that a linkage between the two people is strong. On the other hand, when the social link module 78 determines that the communications between two people is below the predetermined threshold, the social link module 78 may determine that the strength of linkage between the two people is low. It should be pointed out that the information regarding the number of communications between persons may be provided to the social link module 78 by a network device (e.g., service platform 20) providing social network services in response to receipt of a request from the social link module 78.

In this regard, in an instance in which the social link module 78 may determine that a linkage between two people is strong, the social link module 78 may generate graphical elements (e.g., graphical elements 45 and 57) corresponding to the two people with a size that is bigger than in instances in which the social link module 78 may determine that the strength of the linkage between two people is low. Additionally or alternatively, the social link module 78 may generate a size of the links based on the strength of the linkage between people. For example, in an instance in which the social link module 78 determines that a linkage between two people is strong, the social link module 78 may generate the visible indicia associated with a link (e.g., link 63) to have a size that is bigger than a size of a link (e.g., link 67) that the social link module 78 determined that the strength of the linkage between two people is low.

Referring now to FIG. 8, a diagram illustrating one or more shared friends and shared content among persons according to an example embodiment is provided. In the example embodiment of FIG. 8, a network device(s) providing social network services may send the social link module 78 information identifying commonly shared friends of persons corresponding to selected tagged images (e.g., tagged images 82, 84) as well as commonly shared content. For purposes of illustration and not of limitation, the commonly shared content between Steve and Ryan may be one or more photos they have shared, one or more documents they both have been editing, etc. The network device(s) may send this information to the social link module 78 in response to receipt of a request for this information by the social link module 78. In an instance in which the social link module 78 receives the data identifying the shared friends and the shared content, the social link module 78 may enable provision of display of the graphical elements 83, 85, 87, 89, 91 corresponding to visible indicia depicting the shared friends and the shared content 95, 97 superimposed on portions of a respective image 81. In the example embodiment of FIG. 8, the shared content 95 may be a folder and the shared content 97 may be a document. However, the shared content may be data other than a document or folder without departing from the spirit and scope of the invention. For example, the shared content may include, but is not limited to, documents, folders, images, games and any other suitable content, data or the like. In an alternative example embodiment, in an instance in which the social link module 78 may receive data identifying a shared group(s) (e.g., a shared Facebook™ group) in which a selected tagged person(s) and a shared friend(s) belong to, the social link module 78 may enable display of the shared group(s) superimposed on a portion of a respective image (e.g., image 81).

Referring now to FIG. 9, an example embodiment of a flowchart for providing a user-friendly and efficient manner in which to determine one or more shared friends is provided. At operation 900, an apparatus (e.g., apparatus 40) may include means, such as the processor 52, for tagging one or more faces corresponding to persons in an image(s) or video(s). At operation 905, an apparatus (e.g., apparatus 40) may include means such as the detector 60, the processor 52, the social link module 78 and/or the like, for receiving an indication of a selection of at least one of the tagged faces from the image(s) or video(s). At operation 910, an apparatus (e.g., apparatus 40) may include means such as the detector 60, the processor 52, the social link module 78 and/or the like, for generating a message or request requesting identification of one or more commonly shared friends of at least two individuals in response to receipt of the selection of the tagged face that corresponds to one of the individuals.

At operation 915, an apparatus (e.g., apparatus 40) may include means such as the processor 52, the social link module 78, the touch screen display 50 and/or the like, for enabling provision of display of visible indicia, superimposed on the image(s) or video(s), depicting at least one commonly shared friend in response to receipt of information identifying the commonly shared friend. The information identifying the commonly shared friend(s) may be received by the apparatus (e.g., apparatus 40) from a network device(s) (e.g., service platform 20, communication device 15) providing social network services. At operation 920, an apparatus (e.g., apparatus 40) may include means such as the processor 52, the social link module 78, the touch screen display 50 and/or the like, for enabling provision of display of visible indicia, superimposed on the image(s) or video(s), depicting a shortest path relationship of persons connecting the individuals in response to receipt of information specifying that the two individuals do not have any commonly shared friends. Data indicating that the two individuals do not have any commonly shared friends and data associated with the shortest path relationship may be received by the apparatus (e.g., apparatus 40) from a network device(s) providing social network services.

It should be pointed out that FIG. 9 is a flowchart of a system, method and computer program product according to an example embodiment of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 58) and executed by a processor (e.g., processor 52, social link module 78). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In an example embodiment, an apparatus for performing the method of FIG. 9 above may comprise a processor (e.g., the processor 52, the social link module 78) configured to perform some or each of the operations (900-920) described above. The processor may, for example, be configured to perform the operations (900-920) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (900-920) may comprise, for example, the processor 52 (e.g., as means for performing any of the operations described above), the social link module 78, the detector 60, the touch screen display 50 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving an indication of a selection of at least one tagged face from an image;
   facilitating sending of a generated message to a device requesting identification of one or more commonly shared friends of at least two individuals in response to receipt of the selection of the tagged face that corresponds to one of the individuals;
   enabling, via a processor, provision of display of visible indicia superimposed on the image denoting visual indications identifying one or more commonly shared friends of the individuals, the visual indications, superimposed on the image, of the commonly shared friends are associated with the selected tagged face within the image;
   determining a strength of relationship of at least one of the individuals and at least one of the commonly shared friends based in part on a comparison of a number of communications, between the at least one individual and the commonly shared friend, to a predetermined threshold;
   determining that the relationship is strong in response to the comparison indicating that the number of communications equals or exceeds the predetermined threshold; and
   determining that the relationship is weak in response to the comparison indicating that the number of communications is less than the predetermined threshold.

2. The method of claim 1, further comprising:
   determining that the visible indicia identifies the at least one commonly shared friend in response to receipt of information from the device identifying the at least one commonly shared friend.

3. The method of claim 2, further comprising:
   determining that the visible indicia identifies content shared between the individuals, and wherein enabling provision further comprises enabling provision of audio data indicating the commonly shared friends of the at least two individuals.

4. The method of claim 1, further comprising:
   determining that the visible indicia identifies a shortest path relationship of one or more persons associated with the individuals.

5. The method of claim 4, further comprising:
   determining that the shortest relationship path relates to at least one of the persons in which the individuals are indirectly connected.

6. The method of claim 4, further comprising:
   generating one or more links between the persons, at least one of the links is associated with information identifying a relationship between two persons; and
   determining that the image comprises a digital photograph.

7. The method of claim 1, further comprising:
   enlarging a size of the visible indicia in response to determining that the relationship is strong.

8. An apparatus comprising:
   at least one processor; and
   at least one memory including computer program code, the at least one memory and the computer program code configured to, with the at least one processor, cause the apparatus to perform at least the following:
   receive an indication of a selection of at least one tagged face from an image;
   facilitate sending of a generated message to a device requesting identification of one or more commonly shared friends of at least two individuals in response to receipt of the selection of the tagged face that corresponds to one of the individuals;
   enable provision of display of visible indicia superimposed on the image denoting visual indications identifying one or more commonly shared friends of the individuals, the visual indications, superimposed on the image, of the commonly shared friends are associated with the selected tagged face within the image;
   determine a strength of relationship of at least one of the individuals and at least one of the commonly shared friends based in part on a comparison of a number of communications, between the at least one individual and the commonly shared friend, to a predetermined threshold;
   determine that the relationship is strong in response to the comparison indicating that the number of communications equals or exceeds the predetermined threshold; and
   determine that the relationship is weak in response to the comparison indicating that the number of communications is less than the predetermined threshold.

9. The apparatus of claim 8, wherein the at least one memory and the computer program code are further configured to, with the processor, cause the apparatus to:
   determine that the visible indicia identifies the at least one commonly shared friend in response to receipt of information from the device identifying the at least one commonly shared friend.

10. The apparatus of claim 9, wherein the at least one memory and the computer program code are further configured to, with the processor, cause the apparatus to:
    determine that the visible indicia identifies content shared between the individuals; and
    enable provision by enabling provision of audio data indicating the commonly shared friends of the at least two individuals.

11. The apparatus of claim 8, wherein the at least one memory and the computer program code are further configured to, with the processor, cause the apparatus to:

determine that the visible indicia identifies a shortest path relationship of one or more persons associated with the individuals.

12. The apparatus of claim 11, wherein the at least one memory and the computer program code are further configured to, with the processor, cause the apparatus to:
    determine that the shortest relationship path relates to at least one of the persons in which the individuals are indirectly connected.

13. The apparatus of claim 11, wherein the at least one memory and the computer program code are further configured to, with the processor, cause the apparatus to:
    generate one or more links between the persons, at least one of the links is associated with information identifying a relationship between two persons; and
    determine that the image comprises a digital photograph.

14. The apparatus of claim 8, wherein the at least one memory and the computer program code are further configured to, with the processor, cause the apparatus to:
    enlarge a size of the visible indicia in response to determining that the relationship is strong.

15. A computer program product comprising at least one non-transitory computer-readable storage medium having computer-executable program code instructions stored therein, the computer-executable program code in response to execution by a processor causes an apparatus to:
    receive an indication of a selection of at least one tagged face from an image;
    facilitate sending of a generated message to a device requesting identification of one or more commonly shared friends of at least two individuals in response to receipt of the selection of the tagged face that corresponds to one of the individuals;
    enable provision of display of visible indicia superimposed on the image denoting visual indications identifying one or more commonly shared friends of the individuals, the visual indications, superimposed on the image, of the commonly shared friends are associated with the selected tagged face within the image;
    determine a strength of relationship of at least one of the individuals and at least one of the commonly shared friends based in part on a comparison of a number of communications, between the at least one individual and the commonly shared friend, to a predetermined threshold;
    determine that the relationship is strong in response to the comparison indicating that the number of communications equals or exceeds the predetermined threshold; and
    determine that the relationship is weak in response to the comparison indicating that the number of communications is less than the predetermined threshold.

16. The computer program product of claim 15, wherein the computer-executable program code in response to execution by the processor further causes the apparatus to:
    determine that the visible indicia identifies the at least one commonly shared friend in response to receipt of information from the device identifying the at least one commonly shared friend.

\* \* \* \* \*